(12) United States Patent
Zhu (10) Patent No.: US 10,639,910 B2
(45) Date of Patent: May 5, 2020

(54) SYSTEM AND METHODS FOR STORING TEMPLATE DATA AND CREATING PRINTED MATTER BASED UPON SAME

(71) Applicant: BROTHER KOGYO KABUSHIKI KAISHA, Aichi (JP)

(72) Inventor: Feng Zhu, Aichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/362,495

(22) Filed: Mar. 22, 2019

(65) Prior Publication Data

US 2020/0001621 A1 Jan. 2, 2020

(30) Foreign Application Priority Data

Jun. 29, 2018 (JP) ................................. 2018-124121

(51) Int. Cl.
  *G06F 15/00* (2006.01)
  *G06F 3/12* (2006.01)
  *G06K 1/00* (2006.01)
  *B41J 3/407* (2006.01)
  *B41J 3/44* (2006.01)

(52) U.S. Cl.
  CPC ............ *B41J 3/4075* (2013.01); *B41J 3/44* (2013.01); *G06F 3/1204* (2013.01)

(58) Field of Classification Search
  CPC .......... B41J 3/4075; B41J 3/44; G06F 3/1204

USPC ............................. 358/1.15, 1.13, 1.14, 1.1
See application file for complete search history.

(56) References Cited

U.S. PATENT DOCUMENTS

2015/0095772 A1* 4/2015 Kuranoshita ......... G06F 3/1204
                                                          715/273
2016/0335243 A1* 11/2016 Zhai ...................... G06F 17/248

FOREIGN PATENT DOCUMENTS

JP   2004-302634 A   10/2004
JP   2014-123201 A    7/2014

* cited by examiner

*Primary Examiner* — Douglas Q Tran
(74) *Attorney, Agent, or Firm* — Kenealy Vaidya LLP (57) ABSTRACT

There is provided a non-transitory computer-readable recording medium for an operating terminal of a print system including the operating terminal and a printed matter creating device. The operating terminal contains instructions which cause, when executed by a controller, the operation terminal to perform an extended template data obtaining process of obtaining first extended template data generated by a user, the printed matter creating device performing printing based on the first extended template data, a differential template data generating process of generating differential template data based on difference of the first extended template data with respect to the particular basic template data, a size of the differential template data being smaller than a size of the first extended template data, and a template data transmitting process of transmitting the differential template data to the printed matter creating device.

14 Claims, 9 Drawing Sheets

FIG. 2A

TEMPLATE DATA

○ PROFILE DATA
- TEMPLATE ID: 0x008C
- GENERATED DATE: 2016/08/26
- TEMPLATE TYPE: NORMAL

○ OBJECT DATA
- OBJECT DATA I
  - PRINT DATA TYPE: TEXT
  - PRINT POSITION: x1, y1
  - PRINT POINT: p1
  - PRINT CONTENT DATA: "ABC"

- OBJECT DATA II
  - PRINT DATA TYPE: TEXT
  - PRINT POSITION: x2, y2
  - PRINT POINT: p2
  - PRINT CONTENT DATA: "/"

- OBJECT DATA III
  - PRINT DATA TYPE: TEXT
  - PRINT POSITION: x3, y3
  - PRINT POINT: p3
  - PRINT CONTENT DATA: "DEF"

BASIC TEMPLATE DATA

○ PROFILE DATA
· TEMPLATE ID: 0x008C
· GENERATED DATE: 2016/08/26
· TEMPLATE TYPE: NORMAL

○ OBJECT DATA
· OBJECT DATA I
  · PRINT DATA TYPE: TEXT
  · PRINT POSITION: x1, y1
  · PRINT POINT: p1
  · PRINT CONTENT DATA: "ABC"
· OBJECT DATA II
  · PRINT DATA TYPE: TEXT
  · PRINT POSITION: x2, y2
  · PRINT POINT: p2
  · PRINT CONTENT DATA: "/"
· OBJECT DATA III
  · PRINT DATA TYPE: TEXT
  · PRINT POSITION: x3, y3
  · PRINT POINT: p3
  · PRINT CONTENT DATA: "DEF"

FIG. 3B

EXTENDED TEMPLATE DATA

○ PROFILE DATA
· TEMPLATE ID: 0x00D3
· GENERATED DATE: 2018/06/05
· TEMPLATE TYPE: NORMAL

○ OBJECT DATA
· OBJECT DATA I
  · PRINT DATA TYPE: TEXT
  · PRINT POSITION: x1, y1
  · PRINT POINT: p1
  · PRINT CONTENT DATA: "ABC"
· OBJECT DATA IV
  · PRINT DATA TYPE: TEXT
  · PRINT POSITION: x2, y2
  · PRINT POINT: p2
  · PRINT CONTENT DATA: "→"
· OBJECT DATA III
  · PRINT DATA TYPE: TEXT
  · PRINT POSITION: x3, y3
  · PRINT POINT: p3
  · PRINT CONTENT DATA: "DEF"

FIG. 3D

DIFFERENTIAL TEMPLATE DATA
(DIFFERENCE IN OBJECT DATA UNIT)

○ PROFILE DATA
· TEMPLATE ID: 0x00D4
· GENERATED DATE: 2018/06/05
· TEMPLATE TYPE: DIFFERENTIAL
· BASIC TEMPLATE ID: 0x008C

○ OBJECT DATA
· DELETED OBJECT DATA II

· ADDED OBJECT DATA IV
  · PRINT DATA TYPE: TEXT
  · PRINT POSITION: x2, y2
  · PRINT POINT: p2
  · PRINT CONTENT DATA: "→"

BASIC TEMPLATE DATA
○ PROFILE DATA
· TEMPLATE ID: 0x008C
· GENERATED DATE: 2016/08/26
· TEMPLATE TYPE: NORMAL
○ OBJECT DATA
· OBJECT DATA I
 · PRINT DATA TYPE: TEXT
 · PRINT POSITION: x1, y1
 · PRINT POINT: p1
 · PRINT CONTENT DATA: "ABC"
· OBJECT DATA II
 · PRINT DATA TYPE: TEXT
 · PRINT POSITION: x2, y2
 · PRINT POINT: p2
 · PRINT CONTENT DATA: "/"
· OBJECT DATA III
 · PRINT DATA TYPE: TEXT
 · PRINT POSITION: x3, y3
 · PRINT POINT: p3
 · PRINT CONTENT DATA: "DEF"

EXTENDED TEMPLATE DATA
○ PROFILE DATA
· TEMPLATE ID: 0x00D3
· GENERATED DATE: 2018/06/05
· TEMPLATE TYPE: NORMAL
○ OBJECT DATA
· OBJECT DATA I
 · PRINT DATA TYPE: TEXT
 · PRINT POSITION: x1, y1
 · PRINT POINT: p1
 · PRINT CONTENT DATA: "ABC"
· OBJECT DATA IV
 · PRINT DATA TYPE: TEXT
 · PRINT POSITION: x2, y2
 · PRINT POINT: p2
 · PRINT CONTENT DATA: "→"
· OBJECT DATA III
 · PRINT DATA TYPE: TEXT
 · PRINT POSITION: x3, y3
 · PRINT POINT: p3
 · PRINT CONTENT DATA: "DEF"

FIG. 4D

DIFFERENTIAL TEMPLATE DATA
(DIFFERENCE IN PRINT FORMAT DATA UNIT)
○ PROFILE DATA
· TEMPLATE ID: 0x00D4
· GENERATED DATE: 2018/06/05
· TEMPLATE TYPE: DIFFERENTIAL
· BASIC TEMPLATE ID: 0x008C
○ OBJECT DATA
· DIFFERENTIAL OBJECT DATA II
 · PRINT CONTENT DATA: "→"

SYSTEM AND METHODS FOR STORING TEMPLATE DATA AND CREATING PRINTED MATTER BASED UPON SAME

CROSS-REFERENCE TO RELATED APPLICATIONS

This application claims priority under 35 U.S.C. § 119 from Japanese Patent Application No. 2018-124121 filed on Jun. 29, 2018. The entire subject matter of the application is incorporated herein by reference.

BACKGROUND

Technical Field

The present disclosures relate to a print system having an operation terminal and a printed matter creating device creating a printed matter with use of template data, and a non-transitory computer-readable recording medium storing instructions to control operations of the printed mater creating device or the operation terminal.

Related Art

Conventionally, there has been known a method of printing with use of template data which contains one or more pieces of object data, each piece of object data defining a print area and a print format (e.g., font, size and position of a print content). When such template data is used, a user may set a print content for each piece of object data. Then, the print content set by the user is printed at the print area and in accordance with the print format defined by the corresponding piece of object data.

SUMMARY

When the user modifies a plurality of pieces of object data included in particular template data which is obtained from an external server, or when the user adds new object data to the particular template data, the user may transmit the modified template data to the external server so as to be stored therein, the modified template data can be shared among many other users.

There has been known a printer which is configured to store template data so that printed matters can be created with use of template data by itself. With use of such a printer it is unnecessary that an operation terminal, which is connected to the printer, transmits template data or the printer cannot access the external server to obtain template data.

According to aspects of the present disclosures, there is provided a non-transitory computer-readable recording medium for an operation terminal of a print system which including the operation terminal and a printed matter creating device communicatably connected to the operation terminal, the operation terminal including a terminal side storage storing at least one piece of particular basic template data and a plurality of pieces of template data and a controller, each of the plurality of pieces of template data including one or more object defining a print content and a print format, the particular basic template data also being stored in the printed matter creating device. The recording medium contains instructions which cause, when executed by the controller, the operation terminal to perform an extended template data obtaining process of obtaining first extended template data generated by a user, the printed matter creating device performing printing based on the first extended template data, a differential template data generating process of generating differential template data based on difference of the first extended template data with respect to the particular basic template data, a size of the differential template data being smaller than a size of the first extended template data, and a template data transmitting process of transmitting the differential template data to the printed matter creating device.

According to aspects of the present disclosures, there is provided a printed matter creating device of a print system which including an operation terminal and the printed matter creating device communicatably connected to the operation terminal, the printed matter creating device including a conveyer configured to convey a printing medium, a printer configured to perform printing, based on print data, on the printing medium conveyed by the conveyer, and a device side storage configured to store template data including object data defining a particular print content and print format, the printer printing the particular print content on the printing medium in accordance with the format defined by the object data, and a controller configured to control the conveyer and the printer. The controller causes the operation terminal to perform an extended template data synthesizing process of synthesizing second extended template data based on basic template data obtained from among a plurality of pieces of template data stored in the device side storage and particular template data representing data difference of the second template data with respect to the basic template data, a size of the differential template data being smaller than a size of the second extended template data, and a printed matter creating process of controlling the conveyer and the printer based on the second extended template data synthesized in the extended template synthesized process to create a printed matter on which printing is performed.

According to aspects of the present disclosures, there is provided a non-transitory computer-readable recording medium for a printed matter creating device of a print system which including an operation terminal and the printed matter creating device communicatably connected to the operation terminal, the printed matter creating device including a storage storing basic template data, the basic template data including one or more object defining a print content and a print format. The recording medium contains instructions which cause, when executed by the controller, the printed matter creating device to perform an extended template data obtaining process of obtaining first extended template data generated by a user, the printed matter creating device performing printing based on the first extended template data, a differential template data generating process of generating differential template data representing data difference of the first extended template data with respect to the basic template data, a size of the differential template data being smaller than a size of the first extended template data, and a template data storing process of storing the differential template data in the storage.

According to aspects of the present disclosures, there is provided a print system including an operation terminal and a printed matter creating device communicatably connected to the operation terminal. The operation terminal includes a terminal side storage storing at least one piece of particular basic template data and a plurality of pieces of template data and a terminal side controller, each of the plurality of pieces of template data including one or more object defining a print content and a print format. The terminal side controller controls the operation terminal to perform an extended template data obtaining process of obtaining first extended template data generated by a user, the printed matter creating device performing printing based on the first extended template data, a differential template data generating process of generating differential template data based on difference of the first extended template data with respect to the particular basic template data, a size of the differential template data being smaller than a size of the first extended template data, and a template data transmitting process of transmitting the differential template data to the printed matter creating device. The printed matter creating device including a conveyer configured to convey a printing medium, a printer configured to perform printing, based on print data, on the printing medium conveyed by the conveyer, a device side storage configured to store the particular basic template data, the printer printing the particular print content on the printing medium in accordance with the format defined by the object data, and a device side controller configured to control the conveyer and the printer. The device side controller controls the printed matter creating device to perform an extended template data synthesizing process of synthesizing second extended template data based on basic template data obtained from among a plurality of pieces of template data stored in the device side storage and particular template data representing data difference of the second template data with respect to the basic template data, a size of the differential template data being smaller than a size of the second extended template data, and a printed matter creating process of controlling the conveyer and the printer based on the second extended template data synthesized in the extended template synthesized process to create a printed matter on which printing is performed.

DETAILED DESCRIPTION OF THE EMBODIMENT

Hereinafter, referring to the accompanying drawings, a print system 1 according to an illustrative embodiment will be described.

<System Configuration>

Figure 1:
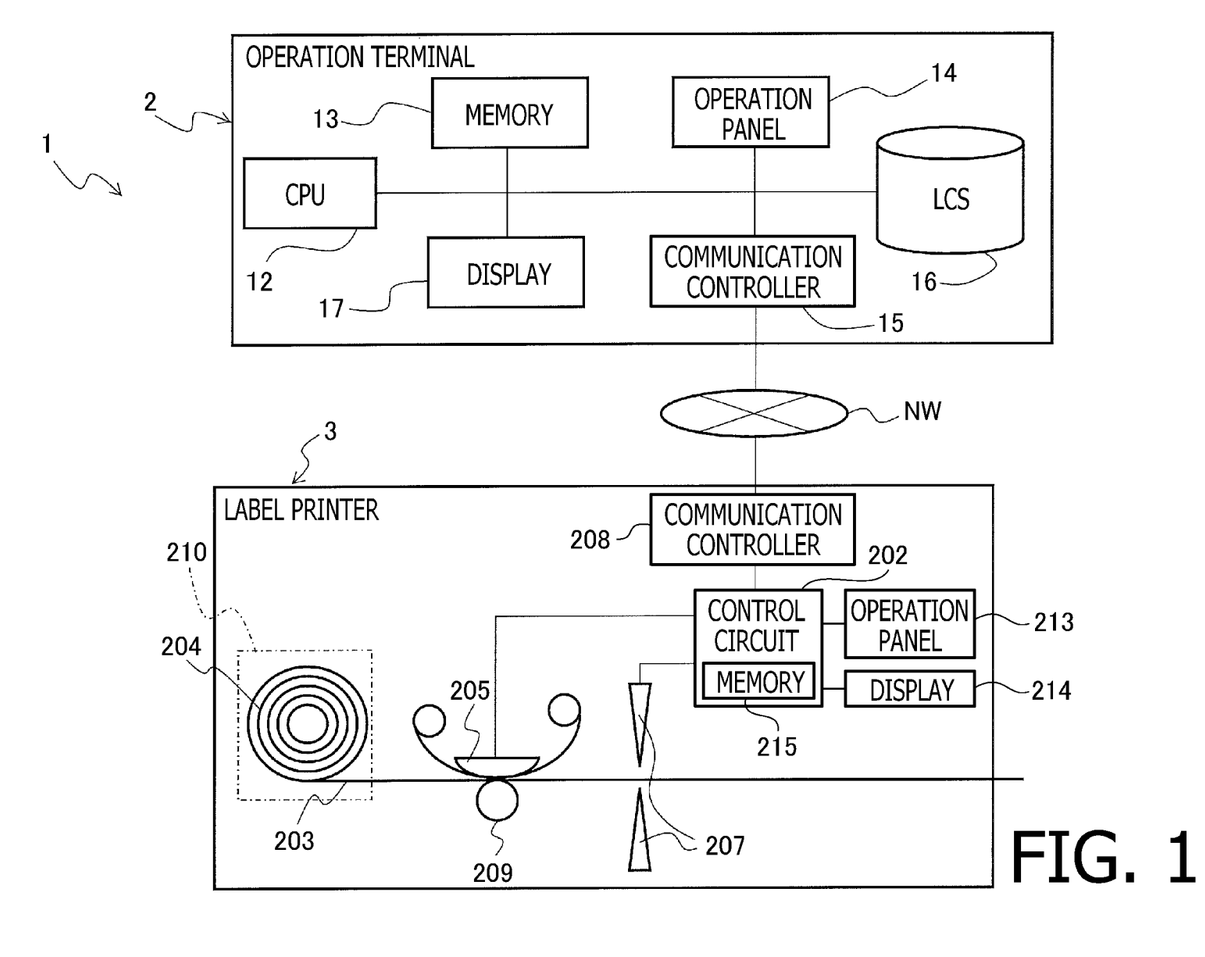
FIG. 1 is a functional block diagram of a print system according to an illustrative embodiment.

FIG. 1 is a functional block diagram schematically showing functional configurations of the print system 1, which is configured to execute a template data processing process. According to the illustrative embodiment, the print system 1 includes an operation terminal 2 (e.g., a personal computer) and a label printer 3 which is connected to the operation terminal 2 through a communication network NW (e.g., a LAN) so that the operation terminal 2 and the label printer 3 can exchange information with each other.

The label printer 3 (which is an example of a printed matter creating device) exchanges various pieces of information and instruction signals with the operation terminal 2. In accordance with user operations on the operation terminal 2 side, the label printer 3 creates a printed label (an example of a printed matter) on which user-desired characters and/or figures are printed.

The operation terminal 2 has a CPU 12, a memory 13 including a RAM and a ROM, an operation panel 14 through which user instructions and information are input, a display 17 configured to display various pieces of information and messages, a communication controller 15 configured to control exchange of information and signals with the label printer 3, and a large-capacity storage (LCS) 16 configured to store various programs including a program for a differential template data generating process (described later) and a plurality of pieces of template data (described later).

The CPU 12 performs, in accordance with programs which have been stored, in advance, in the ROM of the memory 13 or the LCD 16, various processes and exchange of various instruction signals and/or information, with the label printer 3 with use of the RAM configured to temporarily storing data/information.

As shown in FIG. 1, the label printer 3 includes a tape roll holder 210 configured to detachably hold a tape roll 204 which is formed by winding a printing tape 203 (the print tape 203 being an example of a printing medium). It is noted that the printing tape 203 of the tape roll 204 is actually wound spirally. In FIG. 1, however, the printing tape 203 of the tape roll 204 is indicated in a simplified manner and drawn as co-centric circles indicated by solid lines. Further, the tape roll 204 may be accommodated in a cartridge and the cartridge may be detachably attached on the tape holder 210.

The label printer 3 further includes a print head 205 (which is an example of a printing section) configured to perform printing images on the printing tape 203 drawn out of the tape roll 204, a cutter 207 configured to cut out a printed portion of the tape 203 to create a printed label having a particular length. The label printer 3 further includes a conveying device 209 (which is an example of a conveyer) arranged to face the print head 205 and controlled by a control circuit 202 to convey the tape 203 drawn out of the tape roll 204, an operation panel 213 through which instructions and information are input by the user, and a display 214 configured to display various information and messages.

The control circuit 202 is connected to the communication controller 15 of the operation terminal 2 through a communication controller 208 and the communication network NW. Accordingly, the label printer 3 is capable of exchanging information with the operation terminal 2. It is noted that the control circuit 202 has a memory 215 (which is an example of a template storage) storing template data and template set management data, which will be described later.

The control circuit 202 is provided with a memory 215 (which is an example of a device side template storage). The memory 215 stores template data (described in detail later) generated on the operation terminal 2 side. When the template data is stored in the memory 215, it becomes possible that print labels using the template (which is stored in the memory 215) can be created even when the label printer 3 is in a stand-alone state (i.e., when the label 3 printer is not connected to the operation terminal 2 or the like).

<Characteristic Features>

Characteristic features of the print system 1 configured as above include usage of differential template data. In order to increase the number of pieces of template data stored in the memory 215 of the label printer 3, when new template data (hereinafter, referred to as extended template data) is created on the operation terminal 2 side, the differential template data indicating difference of the extended template data with respect to particular basic template data (described later) is generated and stored in the memory 215 of the label printer 3. It is noted that, with use of the differential template data and the basic template data, the extended template data can be reproduced.

In the following description, contents of the differential template data, a method of generating the differential template data, and a method of reproducing the extended template data (which is an example of second extended template data) will be described hereinafter.

<Template Data>

Figure 2A:
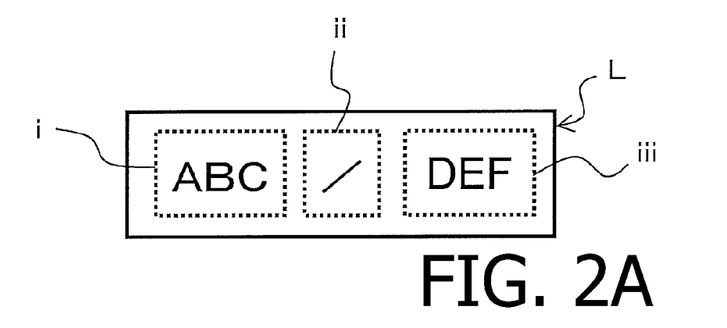
FIG. 2A is an example of a print label.
Figure 2B:
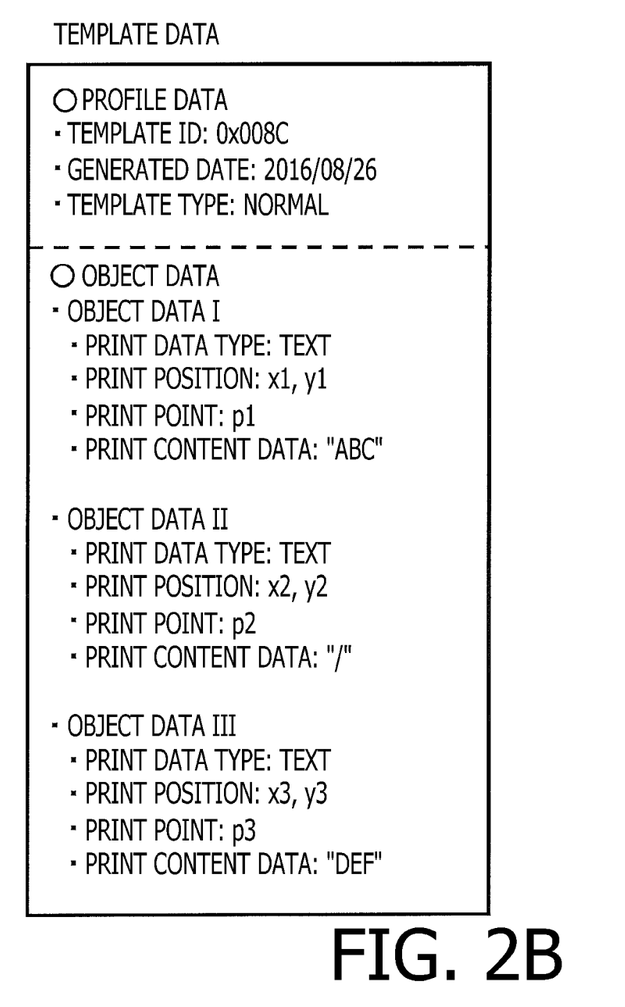
FIG. 2B is an example of template data corresponding to print label shown in FIG. 2A.

FIG. 2A shows an example of a print label L created by the label printer 3. FIG. 2B schematically shows an example of data contents of the template data used to create the data label L shown in FIG. 2A.

In the following example, template data is generated in the differential template generating process executed on the operation terminal 2 side. Then, the generated differential template data is transmitted to the label printer 3 and is stored in the memory 215. On the label printer 3 side, the print label L is created with use of the template data stored in the memory 215 when necessary.

The print label L shown in FIG. 2A is created such that particular character strings are printed on a print surface (on a down side in FIG. 1) and cut out in accordance with a size of a print area. On the example shown in FIG. 2A, three objects i-iii respectively consisting of three character strings (text) "ABC", "/" and "DEF" are linearly arranged, without overlap, in this order.

If it is necessary to input the same print content in order for the user to create a plurality of the same print labels L, the arrangement (positions) and the like again, it is very troublesome for the user. To avoid such troublesomeness, the template data is used conventionally. The template data includes a plurality of pieces of object data each of which defines a format (e.g., a print content, the point number and a style of characters and the like) and position of a print content (e.g., a character string). With use of the template data, the print format (or print content) is formulated in a unit of the print label L.

FIG. 2B shows exemplary data contents of the template data corresponding to the print label shown in FIG. 2A. The data contents of the template data shown in FIG. 2B generally include profile data which is related to the template data itself and object data indicating contents of the print data corresponding to respective objects i-iii (see FIG. 2A).

The profile data shown in FIG. 2B includes template ID (in FIG. 2B, "0x008C") which is identification information of the template data, a generated date of the template data (in FIG. 2B, "2016/08/26", that is, Aug. 26, 2016), and a template type indicating a data type used in the template (in FIG. 2B, "NORMAL").

In the example shown in FIG. 2B, object data I corresponding to the print content "ABC" (the object i in FIG. 2A), object data II corresponding to the print content "I" (the object ii in FIG. 2A) and object data III corresponding to the print content "DEF" (the object iii in FIG. 2A) are indicated as the object data. It is noted that "I", "II" and "III" which are parts of names of the objects i-iii (i.e., object data I, object data II and object data III) serve as identification information of the object data i-iii. Each of the object data I, II and III includes the data type of the print content (in FIG. 2B, "text"), a print position (i.e., coordinates on the print label L) of the print content (e.g., "x1, y1" in FIG. 2B), the point number representing the size of the print content (e.g., "p1" in FIG. 2B) and the print content data representing the print content (e.g., a character string "ABC" in FIG. 2B).

Each piece of the object data I-III is configured such that, in a unit of print content (e.g., the character string "ABC" and the like in FIG. 2A), the corresponding print format data (e.g., the print data type, the print position and the print point (i.e., the font size)) is associated. Optionally or alternatively, in addition to ones indicated above, font data indicating a bold type, an italic type, underlined and/or further styles) may be included as the print format data. Further optionally or alternatively, image data (e.g., a QR code®) may be included as the print content.

As described above, the template data includes many pieces of object data, and each piece of object data includes many pieces of print format data in addition to the print content data. Therefore, the size of the entire template data tends to become large.

<Differential Template Data and Usage Thereof>

Figure 3A:
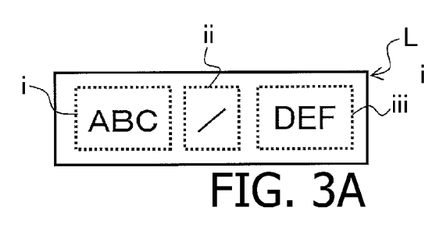
FIGS. 3A and 3B show an example of a print label and basic template data corresponding the print label shown in FIG. 3A.
Figure 3B:
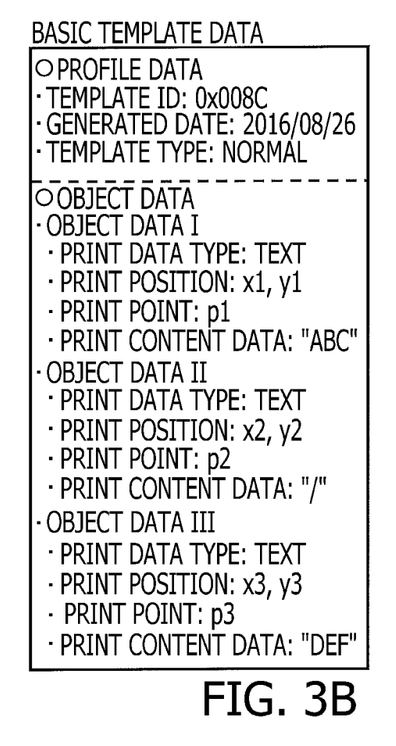
Figure 3C:
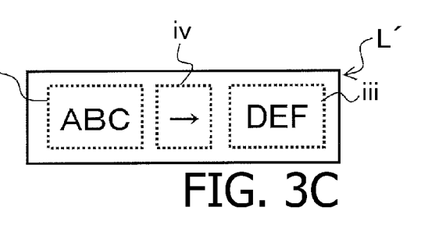
FIGS. 3C and 3D show an example of an extended print label and extended template data corresponding to the print label shown in FIG. 3C.
Figure 3D:
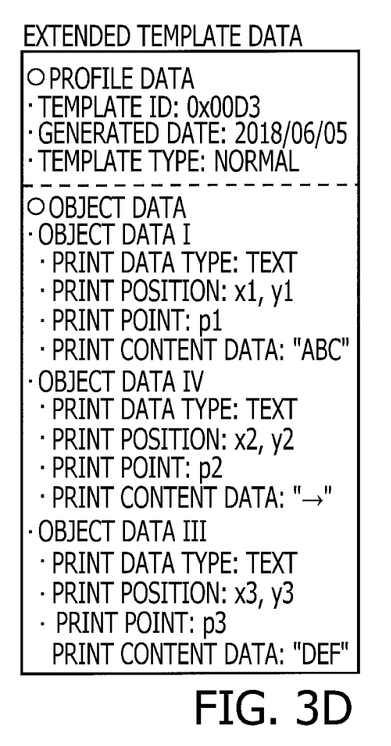
Figure 3E:
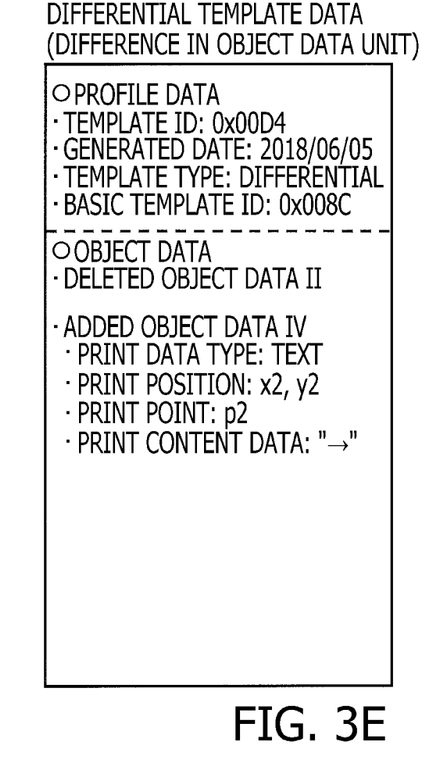
FIG. 3E is differential template data indicating difference in a unit of object data between the basic template data shown in FIG. 3B and the extended template data shown in FIG. 3E.

According to the illustrative embodiment, the differential template data as shown in FIG. 3E is generated. It is assumed that the template data shown in FIG. 3B (which is the same as the template data show in FIG. 2B) for creating the print label L shown in FIG. 3A (the same as FIG. 2A) has been generated and stored in the memory 215. Further, it is assumed that the template data shown in FIG. 3D for creating the print label L shown in FIG. 3C is newly generated.

The print label L shown in FIG. 3A and the print label L shown in FIG. 3C are different such that only the print content of the object ii (FIG. 3A) is different from the print content of the object iv (FIG. 3C) while the print contents of the other objects i and iii are the same. When many parts of the contents of the newly generated template data are the same as those of the contents of the existing template data (concretely, the object data and its configuration are analogous), the differential data representing differences between the newly generated template data and the existing template data is simple data of which data size is small. Hereinafter, the data representing difference between two pieces of data will be referred to as a data difference. Thus, it could be said that the differential data representing data difference between the newly generated template data and the existing template data.

According to the illustrative embodiment, the existing template data (i.e., the template data shown in FIG. 3B) is referred to as basic template data, and the newly generated template data (i.e., the template data shown in FIG. 3D) is referred to as extended template data. The differential template data (FIG. 3E) is generated based on the basic template data (FIG. 3B) and the extended template data (FIG. 3D). In the example shown in FIGS. 3A-3E, the differential template data is generated based on the data difference of the extended template data with respect to the basic template data. Concretely, the data difference includes deletion of the object data II from the basic template data and addition of object data IV to the basic template data (instead of the object data II). By applying the changes indicated in the differential template data to the basic template data, the print content "/" (i.e., the object ii) of the print label L shown in FIG. 3A is changed to "→" (i.e., the object iv) in FIG. 3C. It is noted that "deleted object data II" indicated in the differential template data indicates deletion of the object data II from the basic template data, and "added object data IV" indicates addition of the object data IV to the basic template data.

As shown in FIG. 3E, the differential template data is generated to include the deleted object data II and the added object data IV, and further, profile data. It is noted that, in the differential template data, the profile data is configured such that the template type is set to "DIFFERENTIAL" so as to be discriminative from template data having the template type of "NORMAL" which could be the basic template. Further, it is preferable to assign a new template ID to the differential template data, the new template ID being different from the template ID of the basic template data or the extended template data related to the differential template data. Further, the profile data of the differential template data is configured to include the template ID of the basic template data based on which the extended template data is generated. It is noted that the basic template ID is an example of identification information of the basic template data.

The size of the differential template data generated as above is smaller than the size of the extended template data (hereinafter, the extended template data generated on the operation terminal 2 will also be referred to as original extended template data) even if size of the entire data (i.e., including the profile data) are compared with the original extended template data.

FIGS. 4A-4E show a case where the data difference between the basic template data and the extended template data is obtained by a unit of the print format data. In this case, since substantial data difference is only the print content data "→" (i.e., "/" is replaced with "→"), the size of the entire differential template data (see FIG. 4E) is further reduced in comparison with the differential template data shown in FIG. 3E. It is noted that the "differential object data II" in the differential template data shown in FIG. 4E includes only part of the object data II of the extended template data. That is, the differential template data shown in FIG. 4E indicates only part of the object data replacing the corresponding part of the object data of the basic template data and part of the object data of the basic template data to be deleted is not included.

With use of the differential template data and the corresponding basic template data (i.e., the basic template data indicated by the basic template ID in the profile data of the differential template data), the extended template data same as the original extended template data can be reproduced. Concretely, by applying data processing (e.g., deletion, addition, change, replacement and/or overwriting) of the object data indicated by the differential template data to the object data of the basic template data, the extended template data same as the original extended template data can be reproduced.

As described above, according to the print system 1, when new extended template data is generated on the operation terminal 2 side, in accordance with the differential template data generating process, differential template data indicating data difference of the generated extended template data with respect to one of a plurality of pieces of basic template data which have been stored in, for example, the LCS 16, and the generated differential template data is transmitted to the label printer 3 so as to be stored in the memory 215 of the label printer 3. In the memory 215, normal template data group containing a plurality of pieces of normal template data same as those stored in the operation terminal 2 has been stored. In addition to the normal template data group, a differential template data group containing differential template data received from the operation terminal 2 is stored in the memory 215. According to the above configuration, in comparison with a case where the label printer 3 receives the expanded template data and stores the same in the memory 215, the label printer 3 can have a margin in capacity of the memory 215. That is, by storing the differential template data instead of the extended template data, the number of pieces of template data storable in the memory 215 is largely increased. Since a lot of pieces of differential template data is stored in the memory 215, even if the label printer 3 is in a stand-alone state (i.e., when the label printer 3 is not connected with the operation terminal 2), the extended template data same as the original template data can be reproduced, on the label printer 3 side, based on the basic template data and the corresponding differential template data, and printing can be performed with use of the user-desired extended template data.

Figure 9:
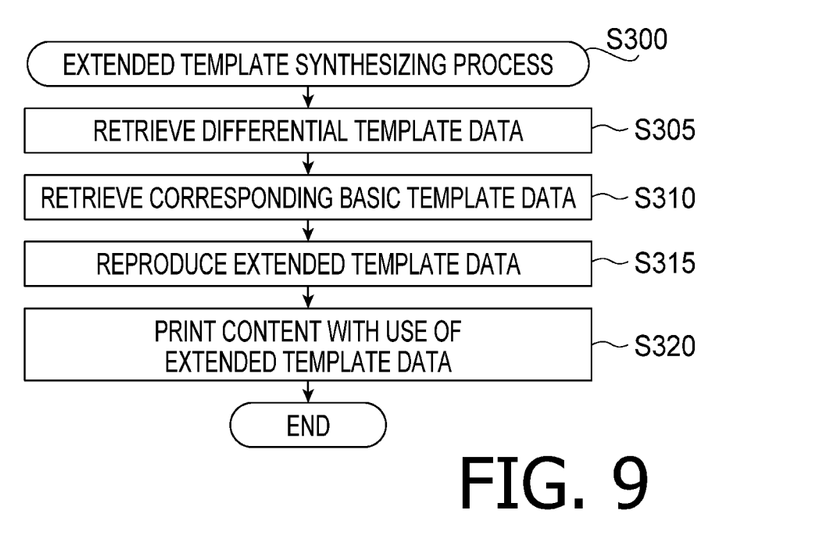
FIG. 9 is a flowchart illustrating a printing process using the extended template data which is synthesized based on the basic template data and the differential template data.

FIG. 9 is a flowchart illustrating the printed matter creating process (S300). In S305, the control circuit 202 retrieves desired differential template data from the memory 215. Next, in S310, the control circuit 202 retrieves the basic template data corresponding to the differential template data retrieved in S202. In S315, the control circuit 202 synthesizes the differential template data retrieved in S305 and the corresponding basic template data retrieved in S310 (i.e., modifies the basic template data retrieved in S310 based on the contents of the differential template data retrieved in S305) to reproduce the extended template data. Then, in S320, the control circuit 202 performs printing in accordance with contents of the reproduced extended template data.

It is noted that the original extended template data generated on the operation terminal 2 side is an example of first extended template data, and the extended template data reproduced on the label printer 3 side is an example of second extended template data. Further, a process executed by the control circuit 202 when the label printer 3 receives the differential template from the operation terminal 2 is an example of a receiving process, and a control process executed by the control circuit 202 when the extended template data is reproduced based on the received differential template data and the basic template data is an example of an extended template data reproducing process. A process executed by the control circuit 202 to create the print label(s) based on the reproduced extended template data is an example of a printed matter creating process.

<Method of Generating Differential Template Data>

Figure 5:
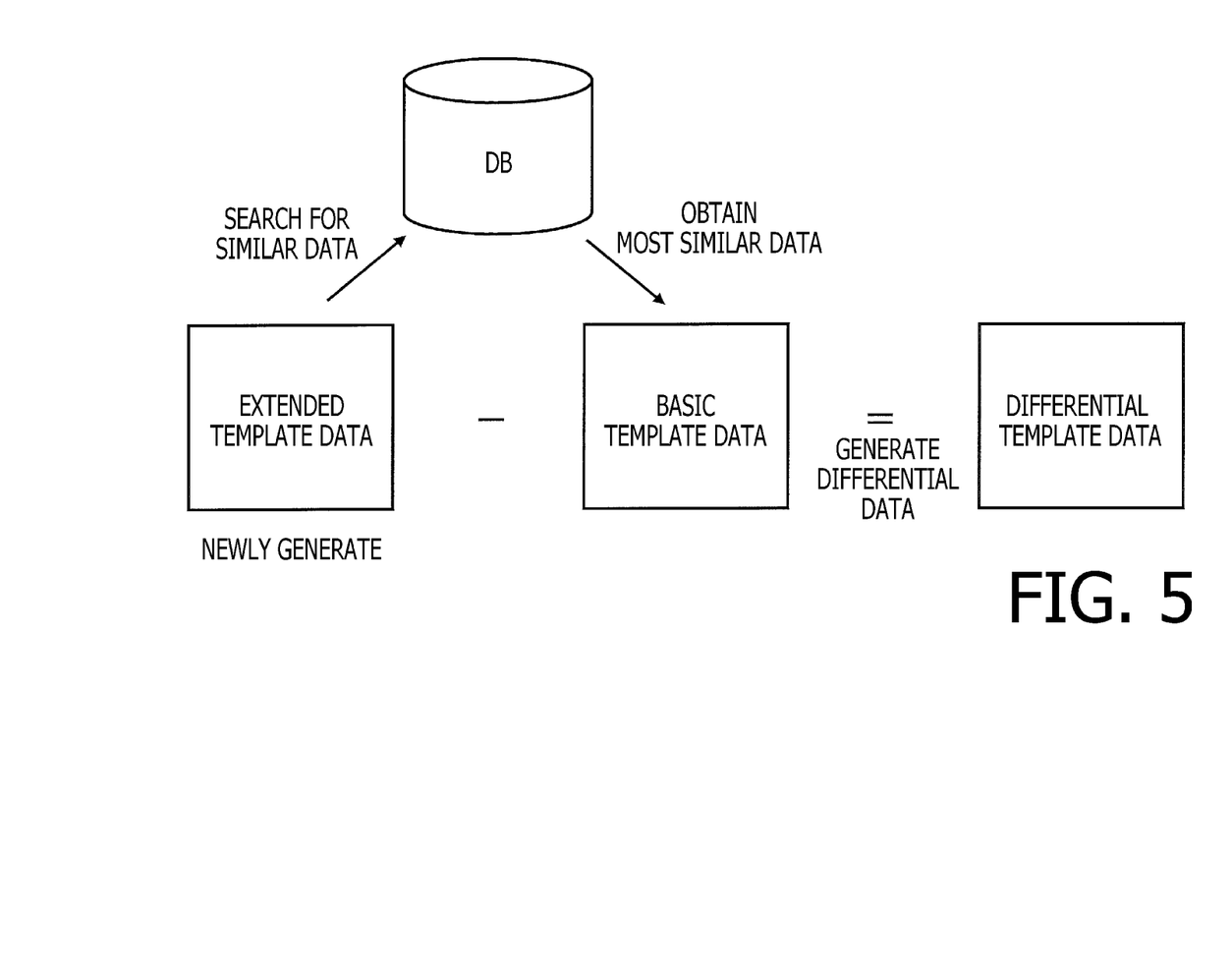
FIG. 5 illustrates a method of generating differential template data when extended template data is generated arbitrarily.

Hereinafter, referring to FIG. 5, a method of generating the differential template data which is executed by the operation terminal 2 in a differential template generating process will be described. As described above, in the LCS 16 of the operation terminal 2, database DB containing a lot of pieces of normal template data has been configured.

According to the present embodiment, as the user utilizes an editing function during the differential template generating process, new extended template data can be generated arbitrarily from the beginning. That is, with respect to a blank print label displayed on an edit screen (not shown), the user can perform an operation to arbitrarily add objects onto the print label. Then, the CPU 12 generates the extended template data corresponding to the resultant print label with the objects being arranged thereon.

After the extended template data is generated, with use of a collation function implemented in the differential template generating process, the CPU 12 searches the database DB in the LCS 16 for normal template data having the closest (e.g., overlapped) data contents (e.g., an object configuration) to the data contents of the object data of the newly generated extended template data, and the searched template data is defined as the basic template data. Then, the CPU 12 obtain the data difference of the newly generated extended template data with respect to the basic template data, and generates the differential template data having the data difference as the object data. It is noted that the profile data of the basic template ID is included as the basic template ID in the profile data of the differential template data as described above.

<Differential Template Generating Process>

Figure 6:
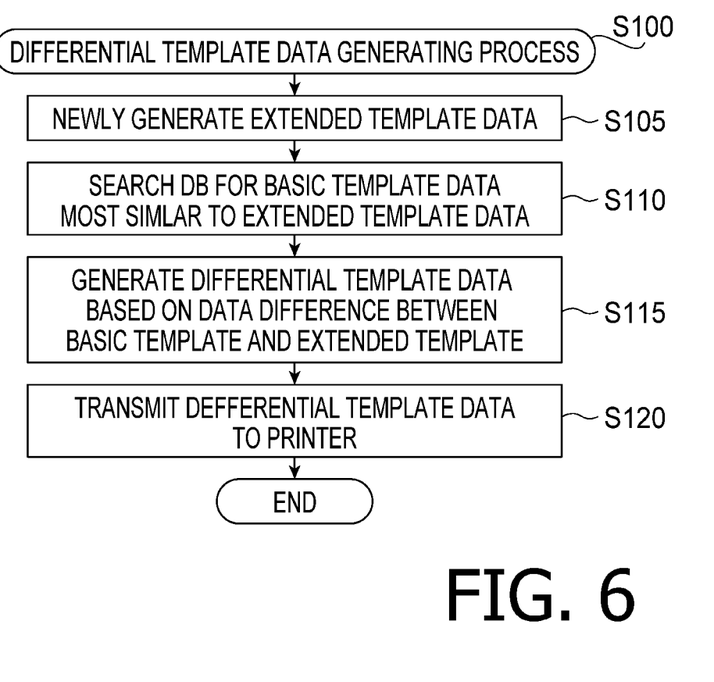
FIG. 6 is a flowchart illustrating an example of a differential template data generating process executed by a CPU of an operation terminal when the extended template data is generated arbitrarily.

FIG. 6 is a flowchart illustrating the differential template data generating process S100 to be executed by the CPU 12 of the operation terminal 2. It is noted that all the pieces of the normal template data stored in the LCS 16 of the operation terminal 2 are also stored in the memory 215 of the label printer 3. When the user operates the operation panel 14 of the operation terminal 2 to generate new template data, the differential template data generating process shown in FIG. 6 is started.

In S105, the CPU 12 generates the new extended template data in accordance with the user's operation with use of the editing function. It is noted that the process in S105 is an example of an extended template data generating process.

Next, in S110, the CPU 12 collates the extended template data generated in S105 with the normal template data contained in the database DB to search for one having the closest data contents of the object data to those of the extended template data based generated in S105. The searched normal template data is used as the basic template data.

Next, in S115, the CPU 12 obtains data difference of the extended template data generated in S105 with respect to the basic template data obtained in S110, and generates the differential template data based on the data difference. It is noted that the process of S110 and S115 is an example of the differential template data generating process.

Next, in S120, the CPU 12 transmits the differential template data generated in S115 to the label printer 3, and terminates the differential template data generating process. It is noted that the process in S120 is an example of a transmitting process. The above-described process of handling the template data, including the differential template data generating process, executed on the operation terminal 2 side is an example of a template processing process.

<Effects of Embodiment>

As described above, according to the differential template generating process according to the illustrative embodiment, the closer the data contents of the basic template data and the extended template data are, the smaller the is of the differential template data is. Then, based on the differential template data and the existing basic template data, the extended template data same as the original extended template data can be reproduced. That is, by transmitting the differential template data of which size is much smaller than the original extended template data is transmitted to the label printer 3 so as to be stored in the memory 215, the same results as a case where the original extended template data is stored in the memory 215 can be achieved. Since the size of the differential template data is much smaller than the corresponding original extended template data, relatively a large number of pieces of differential template data can be stored in the memory 215.

According to the illustrative embodiment, the user arbitrarily generates the extended template data in S105. Then, in S110, the CPU 12 obtains searches the database DB stored in the LCS 16 for template data of which object configuration is similar to that of the extended template data as the basic template data. Then, in S115, the CPU 12 generates the differential template data based on the data difference between the basic template data and the extended template data.

Thus, based on the original extended template data which is generated by the user arbitrarily, the basic template data is automatically obtained. That is, the arbitrary extended template data is firstly generated, and thereafter, template data having the similar object configuration to the extended template data is extracted from the database DB stored in the LCS 16 as the basic template data. As a result of above configuration, the user can generate the extended template data at high degree of freedom, and selection of the basic template data corresponding to the original extended template and generation of the differential template data based on the basic template data and the extended template data can be performed automatically.

Further, according to the present embodiment, the differential template data representing data difference between the basic template data and the extended template data is generated in a unit of an object as shown in FIG. 3. In such a case, the data contents of the differential template data can have a simple structure such as addition, deletion and/or replacement in a unit of an object.

Further, according to the present embodiment, the differential template data representing data difference between the basic template data and the extended template data may be generated in a unit of print format data as shown in FIG. 4. In such a case, it becomes possible to make detailed changes including changes in a unit of print format data within each object with suppressing data amount of the differential template data.

Further, in the example shown in FIG. 3E, the differential template data indicates a deleted portion (e.g., object data II) and an added portion (e.g., object data IV). Therefore, when the extended template data is reproduced based on the basic template data (e.g., FIG. 3B) and the differential template data (e.g., FIG. 3E), the deleted portion (e.g., object data II) indicated in the differential template data is deleted from the basic template data and the added portion (e.g., object data IV) indicated in the differential template data is added to the basic template data.

Figure 4A:
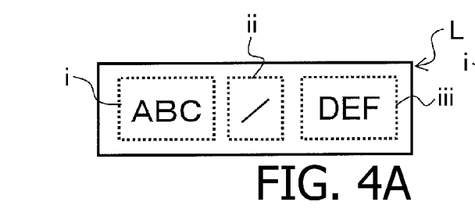
FIGS. 4A and 4B show an example of a print label and basic template data corresponding to the print label shown in FIG. 4A.
Figure 4B:
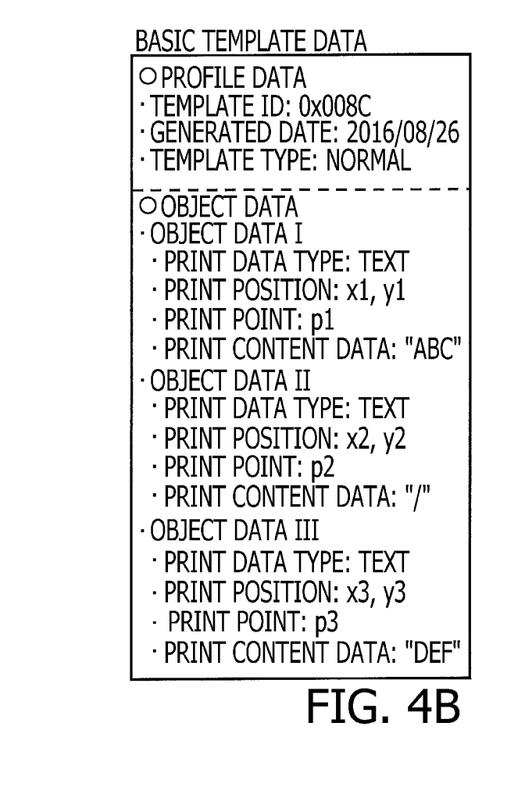
Figure 4C:
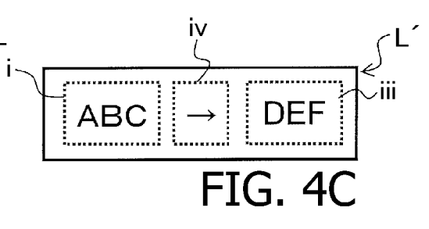
FIGS. 4C and 4D show an example of an extended print label and extended template data corresponding to the print label shown in FIG. 4C.
Figure 4D:
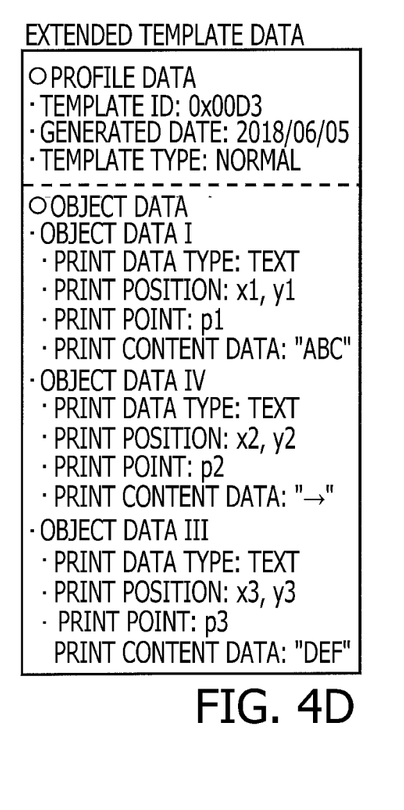
Figure 4E:
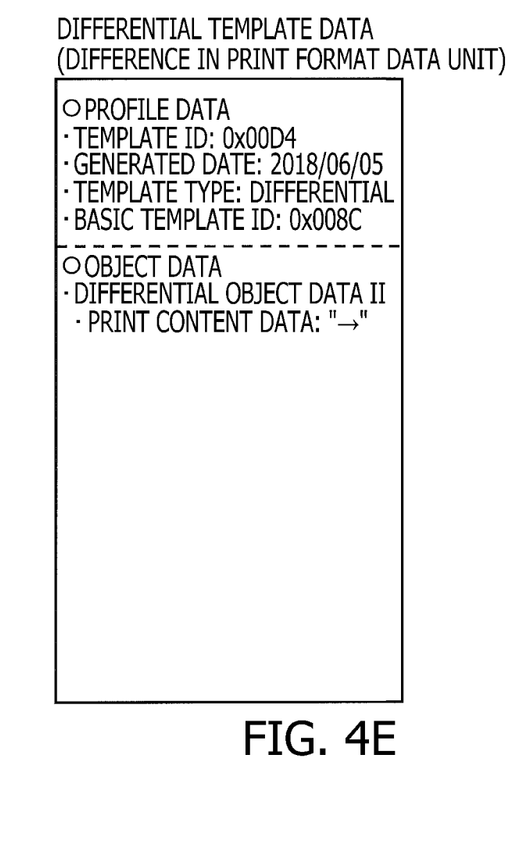
FIG. 4E is differential template data indicating difference in a unit of print format data between the basic template data shown in FIG. 4B and the extended template data shown in FIG. 4E.

In the example shown in FIG. 4E, the differential template data indicates a portion having been replaced (e.g., PRINT CONTENT DATA: "→" of object data II) but does not explicitly indicate the deleted portion in the extended template data since it is sufficient that the portion having been replaced is indicated. In this case, the corresponding portion of the basic template data is to be replaced (or overwritten) with the content indicated in the differential template data to generate the extended template data. In this specification, this type of data is also referred to as the differential data.

Still further, according to the present embodiment, the differential template data is generated with including the identification information of the basic template data (i.e., the basic template ID). Accordingly, even if multiple pieces of extended template data corresponding to different pieces of basic template data are generated, correspondence between each piece of the extended template data and corresponding basic template data is clear and the basic template data corresponding to a particular differential template data can be obtained easily.

Further, according to the present embodiment, the label printer 3 receives the differential template data from an external operation terminal 2, and with use of the received differential template data and the basic template data corresponding to the received differential template data, generates the extended template. That is, the user can make the operation terminal 2, which enables the user to generate the extended template data in detail and relatively easily, generate the template data. Further, the user makes the operation terminal 2 to separately perform selection of the basic template data and generation of the differential template data. As a result, the user convenience can be enhanced, while processing configuration of the label printer 3 is simplified so that processing load can be reduced.

According to the above-described embodiment, it is assumed that all the pieces of normal template data stored in the LCS 16 of the operation terminal 2 are also stored in the memory 215 of the label printer 3. There could be a case where the user generates particular template data on the operation terminal 2 side and stores the same only in the database DB of the LCS 16 and generates the differential template data corresponding to new extended template data with using the particular template data as the basic template data.

In such a case, if the template data used as the basic template data in S120 of the differential template data generating process executed by the operation terminal 2 is supposed to be repeatedly used in the future, the CPU 12 may transmit the differential template data and the basic template data (i.e., the particular template data in the above example), which has not been stored in the memory 215 of the label printer 3, corresponding to the differential template data to the label printer 3, instead of transmitting the extended template data alone. According to such a configuration, even if the differential template data is generated with use of the particular template data, which has not been stored in the memory 215 of the label printer 3, as the basic template data, the extended template data same as the original extended template data can be reproduced on the label printer 3 side. In the above case, both the received basic template data (i.e., the particular template data) and the differential template data may be stored in the memory 215.

There could be a case where the user wishes to delete some pieces of normal template data stored in the LCS 16 or the memory 215 are to be deleted. However, there exists the differential template data which is generated using the normal template data subject to be deleted as the basic template data, the extended template data cannot be reproduce from the differential template data if the basic template data is deleted. Therefore, if the template data which is used as the basic template data is to be deleted, the extended template data is reproduced based on the differential template data corresponding to the basic template data subject to be deleted before deletion thereof Further, the extended template data thus reproduced is stored in the database DB of the LCS 16 as new normal template data. Once the reproduced template data is stored, the differential template data is unnecessary anymore and can also be deleted from the database DB.

Aspects of the present disclosures need not be limited to the above-described embodiment. The above-described embodiment can be modified in various ways without departing from aspects of the present disclosures. Hereinafter, such modifications will be described in order. In the description of the modifications, elements/portions same as those of the illustrative embodiment, the same reference numbers are assigned and description thereof will be simplified or omitted.

(1) Case Where Extended Template is Generated by Editing Basic template

Figure 7:
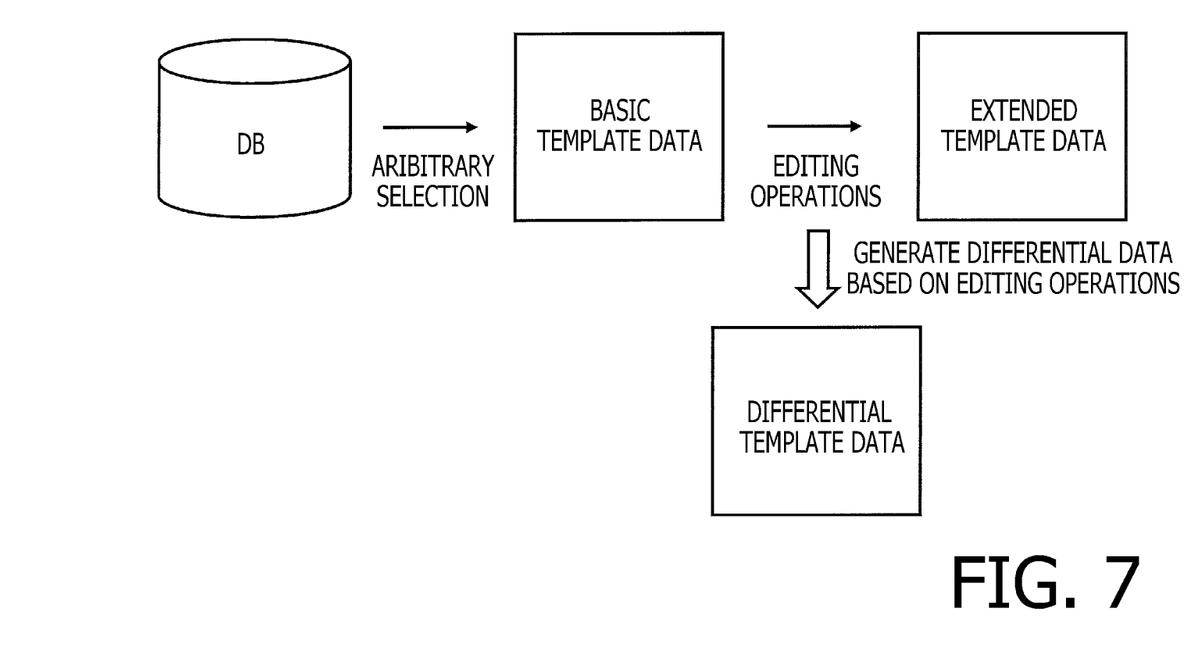
FIG. 7 illustrates a method of generating the differential template data when the extended template data is generated by editing the basic template data.

In the illustrative embodiment, the new extended template data is generated from the beginning. But, aspects of the present disclosures need not be limited to such a configuration. For example, as shown in FIG. 7 (cf. FIG. 5), the user may use the normal template data arbitrarily selected from the database DB as the basic template data and perform an editing operation with use of an editor function on the basic template data to generate the extended template data. In such a case, contents of the editing operations (e.g., deletion, addition and/or modification) applied to the basic template data may be regarded as the differential data and the differential template data may be generated based on the differential data.

Figure 8:
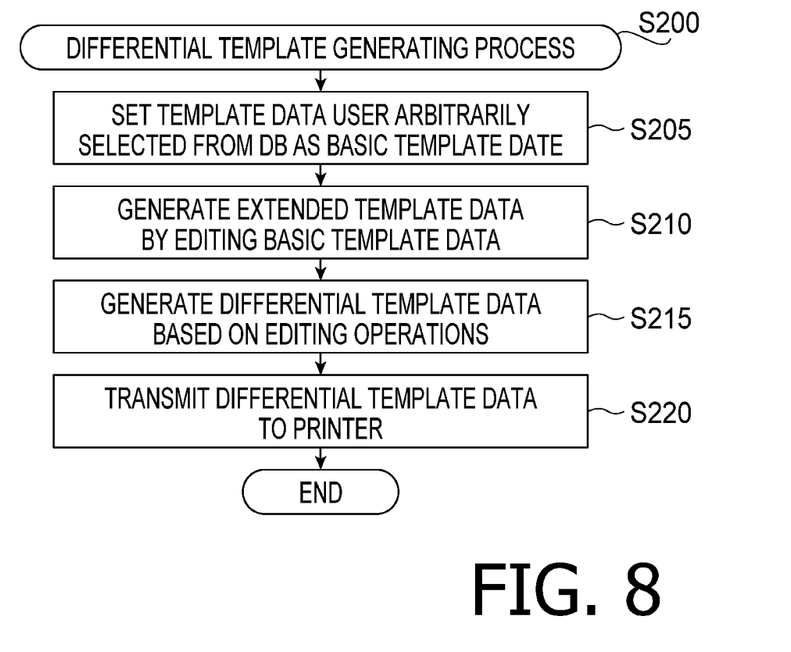
FIG. 8 is a flowchart illustrating an example of a differential template data generating process executed by the CPU of an operation terminal when the extended template data is generated by editing the basic template data.

FIG. 8 is a flowchart illustrating an example of the differential template generating process executed by the CPU 12 of the operation terminal according to such a modification (i.e., a first modification).

Firstly, in S205, the CPU 12 sets the template data the user arbitrarily selected, through the operation panel, from the database DB to the basic template data.

In S210, the CPU 12 generates the extended template data based on the editing operations applied, by the user with use of the editor function, to the basic template data set in S210. It is noted that the process in S205 and S210 is an example of an extended template data generating process.

Thereafter, in S215, the CPU 12 generates the differential template data with using changed contents (e.g., deleted, added and/or modified contents) which were made through the operation panel 14 in S210.

In S220, the CPU 12 transmits the differential template data generated in S215 to the label printer 3, and terminates the differential template data generating process shown in FIG. 8.

As described above, according to the first modification, one of multiple pieces of template data contained in the database DB stored in the LCS 16 and arbitrarily selected by the user is used as the basic template data and the extended template data is generated as the user edits the basic template data.

As above, it is possible to generate the extended template data by editing the basic template data which is arbitrarily selected by the user. That is, the user arbitrarily selects one of a plurality of existing template data as the basic template data. Then, the user partially edits object data and its configuration to generate the extended template data. At this stage, data representing the contents of the edition of the basic template data is used as the differential template data. According to the method, the user can generates the extended template data less troublesomely and the differential template data corresponding to such extended template data can be generated automatically.

(2) Generation of Differential Template Data by Label Printer

In the above-described embodiment and the first modification, the extended template data and the differential template data are generated by the operation terminal 2 during execution of the differential template generating process. However, aspects of the present disclosures need not be limited to such a configuration. For example, the label printer 3 may be configured such that, in accordance with the user's input through the operation panel 213 and with use of the display 214 when the label printer 3 is in a stand-alone status, the extended template data on the label printer 3 side. If the extended template data generated on the label printer 3 side is to be stored for use in the future, the differential template data can be generated automatically on the label printer 3 side. In this case the control process executed by the control circuit 202 to generate the extended template data is an example of an extended template generating process, and the control process executed by the control circuit 202 to store the differential template data in the memory 215 is an example of a differential template storing process.

According to the second modification, it becomes possible that the label printer 3 stand-alone performs from generation of the extended template data to generation and recordation of the differential template data. As a result, without the external operation terminal 2, the data size of the template data on the label printer 3 side can be reduced and the number of pieces of storable template data in the memory 215 of the label print 3 can be increased. It is noted that, on the label printer 3 side, the differential template data may be generated based on the arbitrarily generated extended template data and the analogous basic template data as illustrated in FIG. 5. Alternatively or optionally, the extended template data may be generated as the user edits the arbitrarily selected basic template data, and the differential template data is generated based on the editing contents to generates the user-desired extended template data as illustrated in FIG. 7.

It is noted that, in the above description, terms "vertical", "parallel", "plane" and the like should not be interpreted too strictly. That is, the terms "vertical", "parallel", "planar" and the like are intended to allow designing and manufacturing tolerances and/or errors. Thus, the terms are intended to mean "substantially vertical", "substantially parallel", "substantially planar" and the like.

It is noted that, in the above description, when terms "identical", "equal", "different" and the like are used to express sizes or the like, they should not be interpreted too strictly. That is, the terms "identical", "equal", "different" and the like are intended to allow designing and manufacturing tolerances and/or errors. Thus, the terms are intended to mean "substantially identical", "substantially equal", "substantially different" and the like.

It should also be noted that, when values delimiting value ranges and serving as criteria, the terms "identical", "equal", "different" and the like should be interpreted to have strict meaning.

In the foregoing description, arrows indicated in drawings show examples of flowing directions of signals. It is noted that the arrows do not limit the flowing directions.

It is noted that flowcharts shown in FIGS. 6 and 8 do not intended to limit aspect of the present disclosures (e.g., orders of processes/steps need not be limited to those shown in the drawings). That is, deletion, addition and/or change of execution steps can be incorporated therein without departing from aspects of the present disclosures.

Beside the above-described embodiment and modifications, further modifications and/or combinations of parts thereof may be realized within aspects of the present disclosures.

Although not shown, further modifications can be made to the above-described embodiment and modifications without departing from aspects of the present disclosures.

What is claimed is:

1. Non-transitory computer-readable recording medium for an operation terminal of a print system which including the operation terminal and a printed matter creating device communicatably connected to the operation terminal, the operation terminal including a terminal side storage storing at least one piece of particular basic template data and a plurality of pieces of template data and a controller, each of the plurality of pieces of template data including one or more object defining a print content and a print format, the particular basic template data also being stored in the printed matter creating device, the recording medium containing instructions which cause, when executed by the controller, the operation terminal to perform:

an extended template data obtaining process of obtaining first extended template data generated by a user, the printed matter creating device performing printing based on the first extended template data;

a differential template data generating process of generating differential template data based on difference of the first extended template data with respect to the particular basic template data, a size of the differential template data being smaller than a size of the first extended template data; and a template data transmitting process of transmitting the differential template data to the printed matter creating device.

2. The non-transitory computer-readable recording medium according to claim 1, wherein the instructions cause the controller to:

receive user input of the first extended template data in the extended template data obtaining process;

obtain one of the plurality of pieces of template data analogous to the first extended template data as the particular basic template data and generate the differential template data based on difference of the first extended template data with respect to the particular basic template data in the differential template data generating process.

3. The non-transitory computer-readable recording medium according to claim 1, wherein the instructions cause the controller to:

obtain one of the plurality of pieces of template data analogous to the first extended template data as the particular basic template data and receive user operations to modify the particular basic template data to generate the first extended template data in the extended template data obtaining process; and generate the differential template data based on the received user operations to generate the first extended template data in the differential template data generating process.

4. The non-transitory computer-readable recording medium according to claim 1, wherein the instructions cause the controller to generate the differential template data representing data difference of the first extended template data with respect to the basic template data in a unit of the object data.

5. The non-transitory computer-readable recording medium according to claim 1, wherein the instructions cause the controller to generate the differential template data representing data difference of the first extended template data with respect to the basic template data in a unit of the format data.

6. The non-transitory computer-readable recording medium according to claim 1, wherein the instructions cause the controller to generate the differential template data so as to include identification information of the basic template data in the differential template generating process.

7. The non-transitory computer-readable recording medium according to claim 1, wherein the instructions cause the controller to further transmit the basic template data to the printed matter creating device in the template data transmitting process.

8. A printed matter creating device of a print system which including an operation terminal and the printed matter creating device communicatably connected to the operation terminal, the printed matter creating device including a conveyer configured to convey a printing medium, a printer configured to perform printing, based on print data, on the printing medium conveyed by the conveyer, and a device side storage configured to store template data including object data defining a particular print content and print format, the printer printing the particular print content on the printing medium in accordance with the format defined by the object data, and a controller configured to control the conveyer and the printer, the controller causing the operation terminal to perform:

an extended template data synthesizing process of synthesizing second extended template data based on basic template data obtained from among a plurality of pieces of template data stored in the device side storage and particular template data representing data difference of the second template data with respect to the basic template data, a size of the differential template data being smaller than a size of the second extended template data; and a printed matter creating process of controlling the conveyer and the printer based on the second extended template data synthesized in the extended template synthesized process to create a printed matter on which printing is performed.

9. The printed matter creating device according to claim 8, wherein the controller is configured to perform a receiving process of receiving the differential template data from an external operating terminal, wherein, in the extended template data synthesizing process, the controller is configured to synthesize the second extended template data based on the differential template data received in the receiving process and the basic template data corresponding to the differential template data.

10. The printed matter creating device according to claim 9, wherein the controller also receives the basic template data corresponding to the differential template data from the operation terminal in the receiving process.

11. The printed matter creating device according to claim 8, wherein the controller is configured to perform:

an extended template data obtaining process of obtaining first extended template data to be used when the printed matter creating device performs printing;

a differential template data generating process of generating differential template data representing data difference of the first extended template data generating in the extended template data generating process with respect to particular basic template data; and a differential template data storing process of storing the differential template data generated in the differential template generating process in the device side template data storage, wherein, in the extended template synthesizing process, the controller synthesizes the differential template data obtained by the user arbitrarily from the device side template data storage and basic template data corresponding to the differential template data to reproduce the first extended template data which is obtained in the extended template data obtaining process.

12. Non-transitory computer-readable recording medium for a printed matter creating device of a print system which including an operation terminal and the printed matter creating device communicatably connected to the operation terminal, the printed matter creating device including a storage storing basic template data, the basic template data including one or more object defining a print content and a print format, the recording medium containing instructions which cause, when executed by the controller, the printed matter creating device to perform:

an extended template data obtaining process of obtaining first extended template data generated by a user, the printed matter creating device performing printing based on the first extended template data;

a differential template data generating process of generating differential template data representing data difference of the first extended template data with respect to the basic template data, a size of the differential template data being smaller than a size of the first extended template data; and a template data storing process of storing the differential template data in the storage.

13. The non-transitory computer-readable recording medium according to claim 12, wherein the instructions further cause the controller to perform:

a data synthesizing process of synthesizing the basic template data and the differential template data to reproduce the first extended template data; and a printing process of perform printing in accordance with the first extended template data.

14. A print system including an operation terminal and a printed matter creating device communicatably connected to the operation terminal, the operation terminal including a terminal side storage storing at least one piece of particular basic template data and a plurality of pieces of template data and a terminal side controller, each of the plurality of pieces of template data including one or more object defining a print content and a print format, wherein the terminal side controller controls the operation terminal to perform:
- an extended template data obtaining process of obtaining first extended template data generated by a user, the printed matter creating device performing printing based on the first extended template data;
- a differential template data generating process of generating differential template data based on difference of the first extended template data with respect to the particular basic template data, a size of the differential template data being smaller than a size of the first extended template data; and
- a template data transmitting process of transmitting the differential template data to the printed matter creating device, wherein the printed matter creating device including a conveyer configured to convey a printing medium, a printer configured to perform printing, based on print data, on the printing medium conveyed by the conveyer, a device side storage configured to store the particular basic template data, the printer printing the particular print content on the printing medium in accordance with the format defined by the object data, and a device side controller configured to control the conveyer and the printer, the device side controller controls the printed matter creating device to perform:
- an extended template data synthesizing process of synthesizing second extended template data based on basic template data obtained from among a plurality of pieces of template data stored in the device side storage and particular template data representing data difference of the second template data with respect to the basic template data, a size of the differential template data being smaller than a size of the second extended template data; and
- a printed matter creating process of controlling the conveyer and the printer based on the second extended template data synthesized in the extended template synthesized process to create a printed matter on which printing is performed.

* * * * *